United States Patent
Yang et al.

(10) Patent No.: US 8,554,541 B2
(45) Date of Patent: Oct. 8, 2013

(54) VIRTUAL PET SYSTEM, METHOD AND APPARATUS FOR VIRTUAL PET CHATTING

(75) Inventors: Haisong Yang, Shenzhen (CN); Zhiyuan Liu, Shenzhen (CN); Yunfeng Liu, Shenzhen (CN); Rongling Yu, Shenzhen (CN)

(73) Assignee: Tencent Technology (Shenzhen) Company Ltd., Shenzhen (CN)

( * ) Notice: Subject to any disclaimer, the term of this patent is extended or adjusted under 35 U.S.C. 154(b) by 849 days.

(21) Appl. No.: 12/677,074

(22) PCT Filed: Sep. 18, 2008

(86) PCT No.: PCT/CN2008/072399
§ 371 (c)(1),
(2), (4) Date: Mar. 8, 2010

(87) PCT Pub. No.: WO2009/039769
PCT Pub. Date: Apr. 2, 2009

(65) Prior Publication Data
US 2010/0204984 A1    Aug. 12, 2010

(30) Foreign Application Priority Data
Sep. 19, 2007    (CN) .......................... 2007 1 0154144

(51) Int. Cl.
| | |
|---|---|
| *G06F 17/27* | (2006.01) |
| *G06F 17/21* | (2006.01) |
| *G10L 13/08* | (2013.01) |
| *G10L 15/00* | (2013.01) |
| *G10L 13/00* | (2006.01) |
| *G10L 21/00* | (2013.01) |

(52) U.S. Cl.
USPC ............... 704/9; 704/235; 704/243; 704/246; 704/247; 704/10; 704/260; 704/251; 704/257; 704/258; 704/261; 704/270; 704/270.1; 704/275

(58) Field of Classification Search
USPC ............... 704/235, 243, 9, 10, 260, 251, 257, 704/258, 261, 270, 270.1, 275, 246, 247; 709/206
See application file for complete search history.

(56) References Cited

U.S. PATENT DOCUMENTS 4,305,131 A * 12/1981 Best ............................... 715/716
4,923,428 A * 5/1990 Curran .......................... 446/175
(Continued)

FOREIGN PATENT DOCUMENTS

| CN | 1455357 A | 11/2003 |
| CN | 101075301 A | 11/2007 |

(Continued)

OTHER PUBLICATIONS

Second Chinese Office Action for Application No. 200710154144.2, dated Aug. 28, 2009.
(Continued)

*Primary Examiner* — Edgar Guerra-Erazo
(74) *Attorney, Agent, or Firm* — Marshall, Gerstein & Borun LLP (57) ABSTRACT

A virtual pet system includes: a virtual pet client, adapted to receive a sentence in natural language and send the sentence to a Q&A server; the Q&A server, adapted to receive the sentence, process the sentence through natural language comprehension, generate an answer in natural language based on a result of natural language comprehension and reasoning knowledge, and send the answer in natural language to the virtual pet client. A method for virtual pet chatting includes: receiving a sentence in natural language, perform natural language comprehension for the sentence, and generating an answer in natural language based on a result of natural language comprehension and reasoning knowledge. A Q&A server includes: a sentence comprehension engine unit, adapted to process a received sentence in natural language through natural language comprehension, and send a result of natural language comprehension to a reasoning engine unit; the reasoning engine unit, adapted to generate an answer in natural language based on reasoning knowledge and the result of natural language comprehension, and send the answer in natural language; a knowledge base, adapted to store the reasoning knowledge.

25 Claims, 3 Drawing Sheets

(56) References Cited

U.S. PATENT DOCUMENTS

| | | | |
|---|---|---|---|
| 5,615,296 A * | 3/1997 | Stanford et al. | 704/270.1 |
| 5,730,603 A * | 3/1998 | Harless | 434/308 |
| 5,946,657 A * | 8/1999 | Svevad | 704/275 |
| 6,663,393 B1 * | 12/2003 | Ghaly | 434/262 |
| 6,728,679 B1 * | 4/2004 | Strubbe et al. | 704/270.1 |
| 6,731,307 B1 * | 5/2004 | Strubbe et al. | 715/727 |
| 6,757,657 B1 * | 6/2004 | Kojima et al. | 704/275 |
| 6,772,121 B1 * | 8/2004 | Kaneko | 704/270 |
| 6,792,406 B1 * | 9/2004 | Fujimura et al. | 704/257 |
| 6,795,808 B1 * | 9/2004 | Strubbe et al. | 704/275 |
| 6,931,656 B1 * | 8/2005 | Eshelman et al. | 725/37 |
| 6,943,794 B2 * | 9/2005 | Kamimura et al. | 345/473 |
| 7,013,263 B1 * | 3/2006 | Isaka et al. | 704/9 |
| 7,077,751 B2 * | 7/2006 | Nishiyama et al. | 463/43 |
| 7,222,076 B2 * | 5/2007 | Kobayashi et al. | 704/275 |
| 7,747,785 B2 * | 6/2010 | Baker et al. | 709/250 |
| 2002/0042713 A1 * | 4/2002 | Kim et al. | 704/272 |
| 2002/0049833 A1 * | 4/2002 | Kikinis | 709/219 |
| 2002/0135618 A1 * | 9/2002 | Maes et al. | 345/767 |
| 2002/0187833 A1 * | 12/2002 | Nishiyama et al. | 463/40 |
| 2003/0080989 A1 | 5/2003 | Matsuda et al. | |
| 2003/0156706 A1 * | 8/2003 | Koehler et al. | 379/265.05 |
| 2003/0191560 A1 * | 10/2003 | Yokoo et al. | 700/245 |
| 2004/0044516 A1 * | 3/2004 | Kennewick et al. | 704/5 |
| 2005/0170326 A1 * | 8/2005 | Koehler et al. | 434/350 |
| 2005/0235039 A1 * | 10/2005 | Slotznick | 709/206 |
| 2006/0211463 A1 * | 9/2006 | Nishiyama et al. | 463/1 |

FOREIGN PATENT DOCUMENTS

| | | |
|---|---|---|
| CN | 101119202 A | 2/2008 |
| CN | 101122972 A | 2/2008 |
| GB | 2 465 302 | 5/2010 |
| JP | 2002239230 A | 8/2002 |
| WO | WO-2006/036328 A1 | 4/2006 |

OTHER PUBLICATIONS

Third Chinese Office Action for Application No. 200710154144.2, dated Jan. 29, 2010.

Henzinger, "Hyperlink Analysis for the Web," IEEE Internet Computing, pp. 45-50 (2001).

Examination Report for Application No. GB1005621.6, dated Dec. 19, 2011.

Examination Report for Application No. GB1005621.6, dated Jun. 16, 2011.

German Office Action for Application No. 11 2008 002 548.7, dated Jun. 28, 2013.

* cited by examiner

VIRTUAL PET SYSTEM, METHOD AND APPARATUS FOR VIRTUAL PET CHATTING

The present application claims the priority of a Chinese patent application which was filed on Sep. 19, 2007 to the State Intellectual Property Office of China, the application number being 200710154144.2 and the title being "virtual pet system, method and apparatus for virtual pet chatting", and the entire contents of the previous Chinese application are incorporated into the present application.

FIELD OF THE INVENTION

The present invention relates to artificial intelligence (AI) technologies, and particularly to a virtual pet system, method and apparatus for virtual pet chatting.

BACKGROUND OF THE INVENTION

As computers and computer networks being widely adopted, Internet has penetrated into all aspects of people's work, study and everyday life. In recent years, entertainment software providing virtual pets is becoming more and more popular among Internet users. Virtual pets usually have virtual cartoon appearances, and some intelligent ones even have certain personalities which make them more adorable. A user may get amusement through interactive operations, such as "feeding" a virtual pet, playing games with a virtual pet and so on.

A virtual pet actually is a software system providing entertainment which may run independently on a desktop of a user or be a component of a web page or be in other forms. A virtual pet may run on the Internet, or may run independently in a computer without connection to the Internet.

Figure 1:
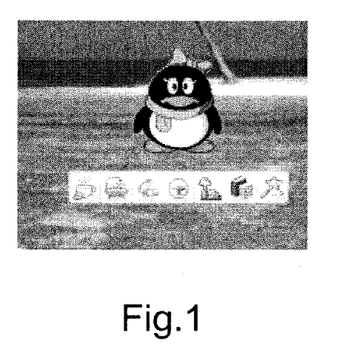
FIG. 1 is a schematic illustrating interaction between a virtual pet and a user in accordance with the prior art.

Although current virtual pets are somewhat intelligent, people expect more. FIG. 1 is a schematic illustrating interaction between a virtual pet and a user in accordance with the prior art. As shown in FIG. 1, some command symbols are defined in current virtual pet system, and users can click a command symbol to perform some uncomplicated interaction with a virtual pet. However, this kind of interaction is so simple that users can not be entertained in a much more intelligent way.

In fact, many users expect their pets to use natural language to chat with them, or even learn language characteristics of the users, but current virtual pets can not satisfy those demands.

SUMMARY OF THE INVENTION

In view of the above, embodiments of the present invention provide a virtual pet system which enables a virtual pet to interact with a user using natural language, so that the user can enjoy more intelligent entertainment experience.

Embodiments of the present invention also provide a method of chatting with virtual pet which enables a virtual pet to interact with a user using natural language, so that the user can be entertained in a more intelligent way.

Embodiments of the present invention still provide a Question and Answer (Q&A) server which is able to interact with a user using natural language, so that the user can be entertained in a more intelligent way.

To attain the above objective, the technical scheme of the present invention is given as follows.

A virtual pet system includes: a virtual pet client and a question and answer (Q&A) server, wherein the virtual pet client is adapted to receive a sentence in natural language and send the sentence to the Q&A server;

the Q&A server is adapted to receive the sentence in natural language, process the sentence through natural language comprehension, generate an answer in natural language based on a result of natural language comprehension and reasoning knowledge, and send the answer in natural language to the virtual pet client.

A method of chatting with virtual pet includes:

A. receiving a sentence in natural language;

B. processing the sentence through natural language comprehension, and generating an answer in natural language based on reasoning knowledge and a result of natural language comprehension.

A question and answer (Q&A) server includes:

a sentence comprehension engine unit, adapted to process a sentence in natural language through natural language comprehension and send a result of natural language comprehension to a reasoning engine unit;

the reasoning engine unit, adapted to generate an answer in natural language based on reasoning knowledge and the result of natural language comprehension; and a knowledge base, adapted to store the reasoning knowledge.

It can be seen from the above technical scheme that, in embodiments of the present invention, after a sentence in natural language is processed through natural language comprehension, an answer in natural language is generated based on reasoning knowledge and the result of natural language comprehension. Therefore, when the present invention is applied, a virtual pet is able to chat with its owner using natural language by virtue of artificial intelligence techniques and natural language processing capabilities, which makes the virtual pet much more intelligent and entertaining.

DETAILED DESCRIPTION OF THE INVENTION

In order to make the object and technical solution of the present invention clearer, a detailed description of the present invention is hereinafter given with reference to the attached drawings and embodiments.

Embodiments of the present invention introduce automatic question and answer (Q&A) technique into a virtual pet system, in order to make the virtual pet system break through the conventional man-machine conversation manner. In this way, a virtual pet can interact with a user using natural language, which enables a more anthropomorphic pet and makes the user feel that the virtual pet is more intelligent and personalized.

Firstly, automatic Q&A technique is a technique that utilizes natural language comprehension technique and Q&A knowledge base for analyzing a question of a user and generating a correct answer. An automatic Q&A system employs natural language comprehension technique as its core technique, relates to multiple subjects such as computational linguistics, information technology and artificial intelligence, and is a hot spot of research in applications such as computer techniques, network techniques and wireless communication techniques. The natural language comprehension technique is an important branch of the artificial intelligence field. It enables a computer to understand and use natural languages of human beings so as to understand a conversation or intention of a user for implementing efficient interactions between man and computer based on natural language.

Embodiments of the present invention provide a virtual pet system which includes: a virtual pet client and a Q&A server, where the virtual pet client is adapted to receive a sentence in natural language and send the sentence to the Q&A server;

the Q&A server is adapted to receive the sentence in natural language, process the sentence through natural language comprehension, generate an answer in natural language based on a result of natural language comprehension and reasoning knowledge, and send the answer in natural language to the virtual pet client.

From the above technical scheme it can be seen that, after the sentence in natural language is processed through natural language comprehension, an answer in natural language is generated based on a result of natural language comprehension and reasoning knowledge. Therefore, a virtual pet is able to chat with its owner using natural language by virtue of making full use of artificial intelligence techniques and natural language processing capabilities, which makes the virtual pet much more intelligent and entertaining.

Figure 2:
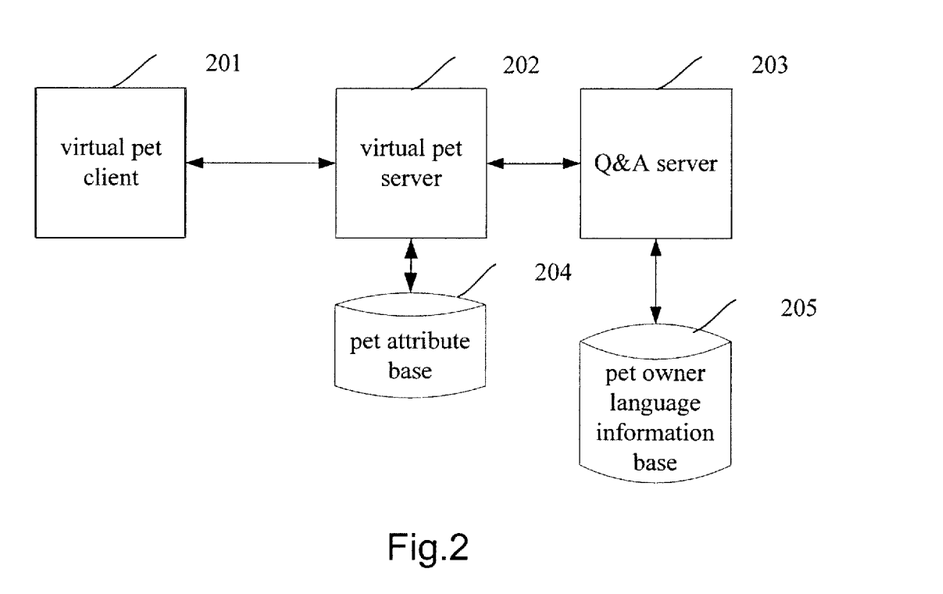
FIG. 2 is a schematic illustrating an exemplary structure of a virtual pet system in accordance with an embodiment of the present invention.

FIG. 2 is a schematic illustrating an exemplary structure of a virtual pet system in accordance with an embodiment of the present invention.

As shown in FIG. 2, the system may include a virtual pet client 201, a virtual pet server 202, a Q&A server 203 and a pet attribute base 204.

The virtual pet client 201 is adapted to receive a sentence in natural language from a pet owner, and send the sentence to the virtual pet server 202.

The virtual pet client 201 can be desktop software, or a virtual pet component in a web page, or a virtual pet component in a wireless communication terminal, or a virtual pet component in a fixed communication terminal. The virtual pet client 201 may also be included in instant messaging tools, or be a stand alone function module.

The virtual pet server 202 is adapted to manage pet attribute information in the pet attribute base 204, and forward the sentence in natural language to the Q&A server 203.

Specifically, the virtual pet server 202 is for adding, deleting, and updating attributes of virtual pets, and storing those attributes into the pet attribute base 204. Attributes of a virtual pet may include: pet attributes, pet owner attributes, pet properties and so on, and preferably, those attributes can be edited.

The Q&A server 203 is adapted to process the sentence in natural language through natural language comprehension, generate an answer in natural language based on a result of natural language comprehension and reasoning knowledge, and send the answer in natural language to the virtual pet client 201.

Preferably, the virtual pet client 201 may also send a user ID (i.e. the ID of the pet owner) to the virtual pet server 202 when sending the sentence in natural language. The virtual pet server 202 may forward the ID of the pet owner to the Q&A server 203. The system may further include a pet owner language information base 205 which is for storing language characteristics of pet owners. The pet owner language information base 205 may be embedded in the Q&A server 203, or stand alone. In this case, the Q&A server 203 is adapted to process the sentence in natural language through natural language comprehension, obtain language characteristics of the pet owner based on the ID of the pet owner, generate an answer in natural language based on a result of natural language comprehension, reasoning knowledge and the language characteristics of the pet owner, and send the answer in natural language to the virtual pet client 201.

Preferably, the Q&A server 203 may also adjust the language characteristics of the pet owner according to the result of natural language comprehension and chatting history of the pet owner, and store the adjusted language characteristics into the pet owner language information base; and generate an answer in natural language based on a result of natural language comprehension, reasoning knowledge and the adjusted language characteristics of the pet owner.

And/or, the Q&A server 203 may also obtain new language characteristics of the pet owner from the result of natural language comprehension, and store the new language characteristics obtained into the pet owner language information base.

The pet attribute base 204 may also be adapted to store pet owner attribute information. Besides storing the pet attribute information and/or pet owner attribute information, the pet attribute base 204 may store other pet-related attributes such as pet properties and so on. The pet attribute base 204 may store information in form of a database or in other forms, and the information can be stored in the virtual pet server 202 or in another server. The virtual pet server 202 may perform management operations on the pet attribute base 204, such as reading, modifying, updating and so on.

In this case, the Q&A server 203 may process the sentence in natural language through natural language comprehension, obtain language characteristics of the pet owner and store the language characteristics into the pet owner language information base 205, obtain pet attribute information and/or pet owner attribute information from the pet attribute base 204 based on the ID of the pet owner, generate an answer in natural language based on a result of natural language comprehension, language characteristics of the pet owner, the pet attribute information and/or the pet owner attribute information, and return the answer in natural language to the virtual pet client 201.

Therefore, the virtual pet may not only interact with a user using natural language, but also learn and use the language characteristics of the user, and thus become much more entertaining.

The pet owner language information base 205 can be omitted in order to keep the system slim or to save the costs. The Q&A server 203 may process the sentence in natural language through natural language comprehension, generate an answer in natural language based on a result of natural language comprehension, reasoning knowledge and language characteristics of the pet owner (the language characteristics of the pet owner may be stored in the Q&A server 203 in advance), and return the answer in natural language to the virtual pet client 201.

If the pet owner language information base 205 is not omitted and the pet attribute base 204 keeps pet owner attribute information and pet attribute information, the Q&A server 203 can be adapted to process the sentence in natural language through natural language comprehension, adjust language characteristics of the pet owner in the pet owner language information base 205 according to natural language comprehension, generate an answer in natural language based on a result of natural language comprehension, language characteristics of the pet owner, the pet attribute information and/or the pet owner attribute information, and return the answer in natural language to the virtual pet client 201.

Preferably, a communication platform can be included between the virtual pet client 201 and the virtual pet server 202. The communication platform is adapted to transport the sentence in natural language and the answer in natural language between the virtual pet client 201 and the virtual pet server 202. The communication platform can be an instant messaging (IM) communication platform, a short message service (SMS) communication platform, a Web communication platform, an Email communication platform, a mobile communication platform, or a Public Switched Telephone Network (PSTN) communication platform, and so on.

According to embodiments of the present invention, a virtual pet is enabled to interact with its owner using natural language and thus becomes more intelligent and entertaining by generating an answer in natural language based on a result of natural language comprehension, reasoning knowledge and language characteristics of the pet owner after processing the sentence in natural language through natural language comprehension. Meanwhile, a user is also enabled to have a much closer relation with his/her pet because the language characteristics of the pet owner are reflected in the answer in natural language, and thus be entertained in a more intelligent way.

Implementations of the present invention may not relay on any communication platform, i.e. the present invention can be implemented within a stand alone system, e.g. as shown in FIG. 1.

In order to support mass amount of users, a dispatch server may also be added between the communication platform and the virtual pet server 202. The dispatch server can be connected to multiple virtual pet server-and-Q&A server pairs, and distribute sentences in natural language among the virtual pet servers according to a load balancing principle so that load of the virtual pet servers and the Q&A servers is balanced.

If the communication platform is not adopted, the dispatch server can be connected with at least two virtual pet servers directly. The dispatch server is adapted to receive sentences in natural language from pet owners and distribute the sentences among the virtual pet servers according to a load balancing principle.

Therefore, load of virtual pet servers and Q&A servers can be balanced by adding a dispatch server between the communication platform and the virtual pet servers.

When there are at least two virtual pet clients, chat between the virtual pet clients can be implemented. In this case, the virtual pet client may be further adapted to receive a sentence in natural language from a second virtual pet client, and send the sentence from the second virtual pet client to a Q&A server. The Q&A server is further adapted to generate an answer in natural language according to the sentence from the second virtual pet client, and return the answer in natural language to the second virtual pet client. The Q&A server may return the answer in natural language to the second virtual pet client by: returning the answer in natural language to the virtual pet client, and the virtual pet client returning the answer to the second virtual pet client.

Likewise, there may be at least two pet owners (e.g. user A and user B). Suppose user A wants to chat with the pet of user B, e.g. by selecting a pet of a friend from a friend list (i.e. pet B of user B) to chat with the pet selected from the friend list (i.e. pet B). The virtual pet client of the pet owner (the virtual pet client of user A) is adapted to receive a sentence in natural language from the pet owner (user A), and send the sentence and information about the pet to be chatted with (i.e. pet B) to the Q&A server. The Q&A server is adapted to process the sentence in natural language received through natural language comprehension, obtain information about pet B, obtain language characteristics of the pet owner of the pet to be chatted with (i.e. user B), generate an answer in natural language based on a result of natural language comprehension, reasoning knowledge and the language characteristics of the pet owner of the pet to be chatted with, and return the answer in natural language to the virtual pet client. Thus, chatting between pet A of user A and pet B of user B is implemented, so that chatting with a virtual pet has diversified forms and is more entertaining.

Preferably, the Q&A server may obtain the language characteristics of the owner of the pet to be chatted with (i.e. user B) from the pet owner language information base based on information about the pet (i.e. pet B), and obtain pet attribute information and/or pet owner attribute information from the pet attribute base based on information about the pet (i.e. pet B). In this case, the answer in natural language is generated based on the result of natural language comprehension, the language characteristics of the pet owner, reasoning knowledge, the pet attribute information and/or the pet owner attribute information obtained.

Specifically, the Q&A server 203 may include:

a sentence comprehension engine unit, adapted to process a sentence in natural language through natural language comprehension and send a result of natural language comprehension to a reasoning engine unit;

a reasoning engine unit, adapted to generate an answer in natural language based on reasoning knowledge and the result of natural language comprehension; and a knowledge base, adapted to store the reasoning knowledge.

Optionally, the knowledge base may be independent of the Q&A server, and the knowledge stored in the knowledge base can be edited.

Preferably, the Q&A server may further include a study engine unit and a pet owner language information base. The pet owner language information base is adapted to store language characteristics of a pet owner. The study engine unit is adapted to obtain new language characteristics of the pet owner according to a result of natural language comprehension, and store the new language characteristics obtained into the pet owner language information base.

Figure 3:
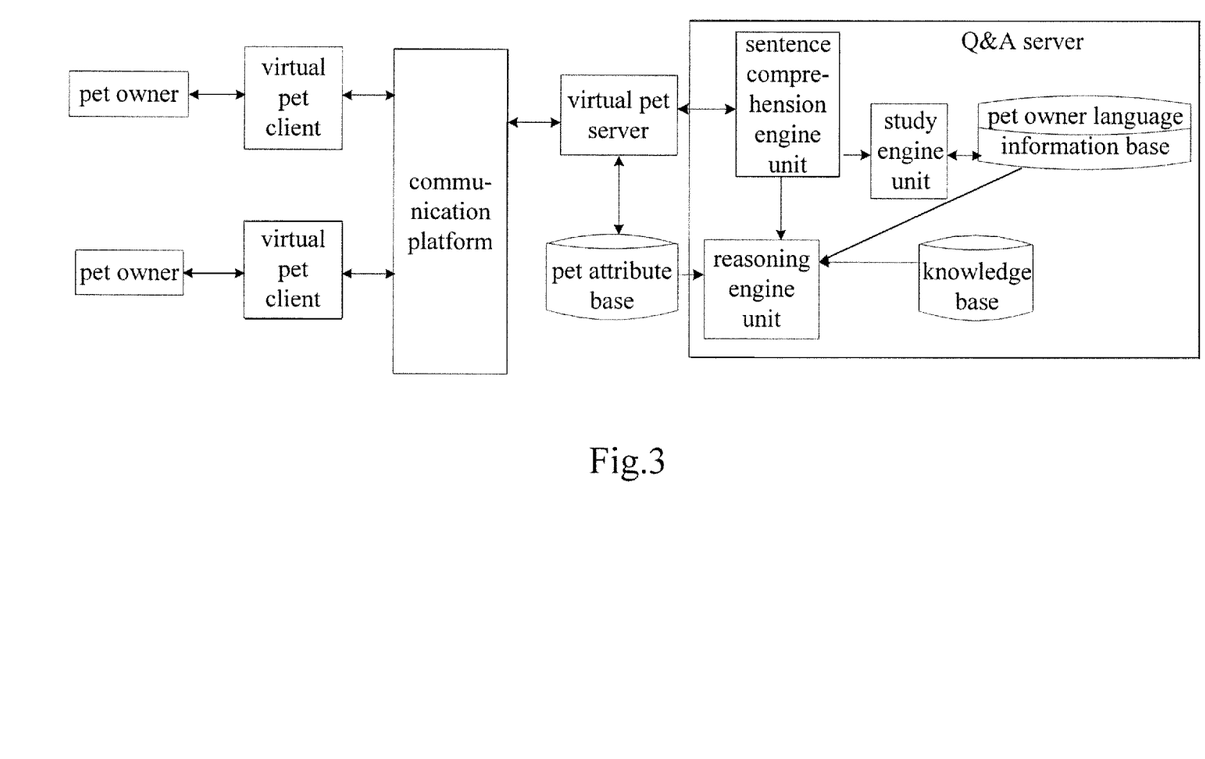
FIG. 3 is a schematic illustrating an exemplary structure of a virtual pet system in accordance with another embodiment of the present invention.

As shown in FIG. 3, an embodiment of the present invention provides a virtual pet system which at least includes a virtual pet client. The virtual pet client may be a desktop software or a virtual pet component provided in a web page. The virtual pet client may be independent of, or included in tools such as an instant messenger.

The system may preferably include a communication platform, e.g. an IM platform. The system may further include a virtual pet server for managing features of virtual pets, such as pet attributes, pet owner attributes, pet properties and so on. The virtual pet server is also adapted to forward a sentence in a chat from the virtual pet client to a Q&A server, and return an answering sentence obtained by the Q&A server to the virtual pet client. The system may also include a pet attribute base for storing information including pet attributes, pet owner attributes, property attributes. The information can be stored as a database or in other forms, and can be stored in the virtual pet server or in another server.

The virtual pet server may read or modify the pet attribute base.

The system may at least include a Q&A server for generating a sentence in natural language imitating a pet's response in response to a question in natural language during a virtual pet chat.

The Q&A server may further extract language characteristics of the pet owner when processing the question in natural language inputted by the pet owner, save the language characteristics into the pet owner language information base, and utilizing the language characteristics when generating the sentence in natural language imitating the pet's response.

The Q&A server includes a knowledge base which stores knowledge for performing natural language reasoning. The knowledge base adopts a format suitable for reasoning, and stores a large amount of knowledge for natural language reasoning Q&A in form of question and answer pairs for the reasoning engine unit to access.

The system may further include a pet owner language information base for storing a recorded chatting history between a pet owner and the pet, and language characteristic information obtained from the recorded chatting history.

The knowledge base and the pet owner language information base may locate in the Q&A server.

The Q&A server may include a sentence comprehension engine unit, a reasoning engine unit and a study engine unit.

The sentence comprehension engine unit is adapted to process a sentence in natural language through natural language comprehension and send a result of natural language comprehension to a reasoning engine unit.

The reasoning engine unit is adapted to generate an answer in natural language based on reasoning knowledge and the result of natural language comprehension.

Specifically, the Q&A server may further include: a first information receiving unit for receiving an ID of a pet owner. In this case, the reasoning engine unit is adapted to obtain language characteristics of the pet owner from the pet owner language information base according to the ID of the pet owner, and generate an answer in natural language based on the result of natural language comprehension, the reasoning knowledge stored in the knowledge base, and the language characteristic of the pet owner.

Preferably, the reasoning engine unit may further obtain pet attribute information and/or pet owner attribute information from a pet attribute base according to the ID of a pet owner, and generate an answer in natural language based on a result of natural language comprehension, reasoning knowledge stored in the knowledge base, language characteristic of the pet owner, and pet attribute information and/or pet owner attribute information.

Alternatively, the Q&A server may further include: a second information receiving unit for receiving information of a pet to be chatted with. In this case, the reasoning engine unit is adapted to obtain language characteristics of the owner of the pet to be chatted with from the pet owner language information base according to the information of the pet to be chatted with, and generate an answer in natural language based on the result of natural language comprehension, the reasoning knowledge stored in the knowledge base, and the language characteristic of the owner of the pet to be chatted with.

Preferably, the reasoning engine unit may further obtain pet attribute information and/or pet owner attribute information from a pet attribute base according to information of the pet to be chatted with, and generate an answer in natural language based on a result of natural language comprehension, reasoning knowledge stored in the knowledge base, language characteristic of the pet owner, and pet attribute information and/or pet owner attribute information.

The Q&A server may further include:

a study engine unit, adapted to obtain language characteristic of the pet owner and store the language characteristic into the pet owner language information base. To be specific, the study engine unit may adjust the language characteristic of the pet owner according to the result of natural language comprehension and the recorded chatting history of the pet owner, and store the adjusted language characteristic into the pet owner language information base; and/or obtain new language characteristic of the pet owner according to the result of natural language comprehension, and store the new language characteristic obtained into the pet owner language information base.

The natural language processing performed by the sentence comprehension engine unit includes sentence trunk extraction, sentence type judgment, topic judgment and so on; and possibly, word separation, when the natural language used between the pet owner and the pet is Chinese.

When generating an answer in natural language, the reasoning engine unit takes information such as the processing result of the sentence comprehension engine unit, the reasoning knowledge stored in the knowledge base, attributes of the pet and the pet owner, and language characteristic of the pet owner and etc. into consideration.

The reasoning engine unit makes use of the attributes of the pet and the pet owner, e.g., adopting specific replacement characters in questions and answers in the knowledge base, and replacing the replacement characters by information from other sources when generating the final answer. For example, an answer "My master is in #MasterSchool#" includes replacement characters "#MasterSchool#", and if a question inputted (e.g., "Which school is your master in?") is found to match the question corresponding to the above answer, the replacement characters will be replaced by an attribute value of the owner of the virtual pet when the final answer is generated. If the value of the attribute "MasterSchool" (the school where the owner studies) of the virtual pet owner is "Huazhong University of Science and Technology", the final answer generated by the Q&A server will be "My master is in Huazhong University of Science and Technology".

If the value of the attribute "MasterSchool" is null (e.g., the pet owner has not submitted the value of the attribute or this attribute of the pet owner can not be obtained through other ways), the Q&A server will generate another answer of "I don't know which school my master is in, and I will ask her next time".

The skilled person in the art should be aware that the above is merely an example of the reasoning, and the reasoning engine unit of the present invention should have, but should not be limited to, the above reasoning functions.

For yet another example, if the owner asks: "Are you hungry?", the pet may have different answers according to the value of an attribute about whether the pet has been fed. If the pet has been fed, the answer may be: "I've just had salmon, and I'm still burping"; if the pet has not been fed, the answer may be: You keep working all the time, and I'm starving, 5555". The study engine unit may take such information as a processing result of the sentence comprehension engine unit, a recorded chatting history stored in the pet owner language information base, stored language characteristics of the pet owner and so on into consideration when extracting the language characteristics of the pet owner. The recorded chatting history stores texts and question type of a chat between a pet and a pet owner.

For example, when a pet asks "Yes or NO" questions such as "Is your girlfriend pretty?" or "Are you handsome?", the user usually answers the pet in a way such as "Of course, my girlfriend is rather pretty!" and "Of course, if I am not handsome, no one else can be regarded handsome". Then, the study engine unit may learn that the user usually uses the phrase "of course" as a positive answer to a question. The study engine unit records such event. When the event occurs repetitively, the language characteristic will be reserved and stored in the pet owner language information base in a form suitable for searching and reasoning.

After that, when the user asks: "Baby, are you satisfied with your supper?", the pet may answer: "Of course, I have eaten so~ much". In this way, the words of the virtual pet can be more vivid, and the user may feel that the pet is more intelligent and distinctive.

That is, the reasoning engine unit makes use of the pet owner language information base when reasoning and generating an answer of the pet in natural language. For example, when the pet owner asks the pet a "yes or no" question (e.g., "Baby, are you satisfied with your supper?"), the reasoning engine unit finds out language characteristics of the pet owner from the pet owner language information base, such as an expression manner (e.g. rhetorical question) or a language tag (e.g. "of course") that the pet owner used for answering previous "yes or no" questions, and generate an answer for the pet in natural language based on the language characteristics (e.g. "Of course, I have eaten so~ much"). Sometimes multiple pieces of language characteristics may be reserved for one type of questions of a pet owner, and the reasoning engine unit may select the most proper language characteristics based on chatting history, pet state attributes and characteristics of answers in the knowledge base for generating an answer.

In the system shown in FIG. 3, if the virtual pet server receives a message not for chatting from the virtual pet client, such as a message for managing pet attributes, pet owner attributes, pet properties and so on, the virtual pet server will process the message and directly return a processing result to the virtual pet client without forwarding the message to the Q&A server. Only messages for chatting from the virtual pet client will be forwarded to the Q&A server.

The processing flow of the system shown in FIG. 3 will be described in detail as follows.

When the pet owner is chatting with the pet, the pet owner inputs a sentence in natural language into the virtual pet client, and the virtual pet client sends the sentence of the owner to the virtual pet server via the communication platform. The virtual pet server forwards the sentence for chatting to the Q&A server.

The sentence comprehension engine unit of the Q&A server processes the chatting sentence through natural language comprehension which may include word separation, sentence trunk extraction, sentence type judgment, topic judgment and so on, and provides a processing result to the reasoning engine unit and the study engine unit respectively.

The study engine unit of the Q&A server concludes or adjusts language characteristics of the pet owner based on the processing result of the sentence comprehension engine unit, recorded chatting history stored in the pet owner language information base and already-stored pet owner language characteristics, and stores the concluded or adjusted language characteristics into the pet owner language information base.

The reasoning engine unit of the Q&A server generates an answer in natural language based on information such as a processing result of the sentence comprehension engine unit, reasoning knowledge stored in the knowledge base, attributes of the pet and the pet owner, and language characteristic of the pet owner and so on. Sometimes multiple pieces of language characteristics may be reserved for one type of questions of a pet owner, and the reasoning engine unit may select the most proper language characteristics for generating an answer based on chatting history, pet state attributes and characteristics of answers in the knowledge base. Therefore, language characteristics utilized for generating the answer in natural language may be the adjusted language characteristics of the pet owner. The Q&A server returns the answer to the virtual pet server which forwards the answer to the virtual pet client via the communication platform, and the virtual pet client presents the answer to the pet owner.

The Q&A server according to an embodiment of the present invention processes the sentence in natural language through natural language comprehension, and then generates the answer in natural language based on the result of natural language comprehension, reasoning knowledge and language characteristics of the pet owner, so that the virtual pet may perform natural language chatting with the pet owner. In this way, the virtual pet becomes more intelligent and entertaining. In addition, since language characteristics of the pet owner are reflected in the answer in natural language, the user may perceive a closer relation with the pet and thus perceive a more intelligent entertaining experience. Further, chatting with a virtual pet is made more flexible and entertaining by generating an answer in natural language based on language characteristics of the pet owner (e.g. user B) which are obtained according to information of the pet to be chatted with (e.g. pet B) after receiving the sentence in natural language of user A and information of the pet to be chatted with (pet B).

Based on the above analysis, an embodiment of the present invention further provides a method for virtual pet chatting.

According to the method provided by the embodiment of the present invention, a sentence in natural language is received firstly; then the sentence is processed through natural language comprehension, and language characteristics of a pet owner are obtained and stored into a pet owner language information base; after that, an answer in natural language is generated based on a result of natural language comprehension, the language characteristics of the pet owner, pet attribute information and/or pet owner attribute information.

In the above method, when the virtual pet may not be required to have language characteristic study functions considering factors such as implementation complexity, the answer in natural language may be generated directly based on the result of natural language comprehension and the reasoning knowledge.

The natural language comprehension may be implemented by performing any one or any combination of the following operations on sentences in natural language: word separation, question trunk extraction, question type judgment and topic judgment.

Specifically, the language characteristics of the pet owner are obtained based on the result of natural language comprehension, recorded chatting history of the pet owner and already-stored language characteristics of the pet owner, and then stored into the pet owner language information base. The answer in natural language is generated based on the result of natural language comprehension, reasoning knowledge, pet attribute information and/or pet owner attribute information, and language characteristics of the pet owner stored in the pet owner language information base.

The embodiment of the present invention adopts automatic Q&A techniques and is based on natural language processing, thus enabling a virtual pet to interact with a user in the form of natural language. The virtual pet can study language characteristics of the user such as language tips and expression manners during a long term conversation with the user. Afterwards, the virtual pet may use those language characteristics in answering questions of the user, enabling the answers to reflect those language characteristics and language style. In this way, the user may enjoy more intelligent entertainment.

Figure 4:
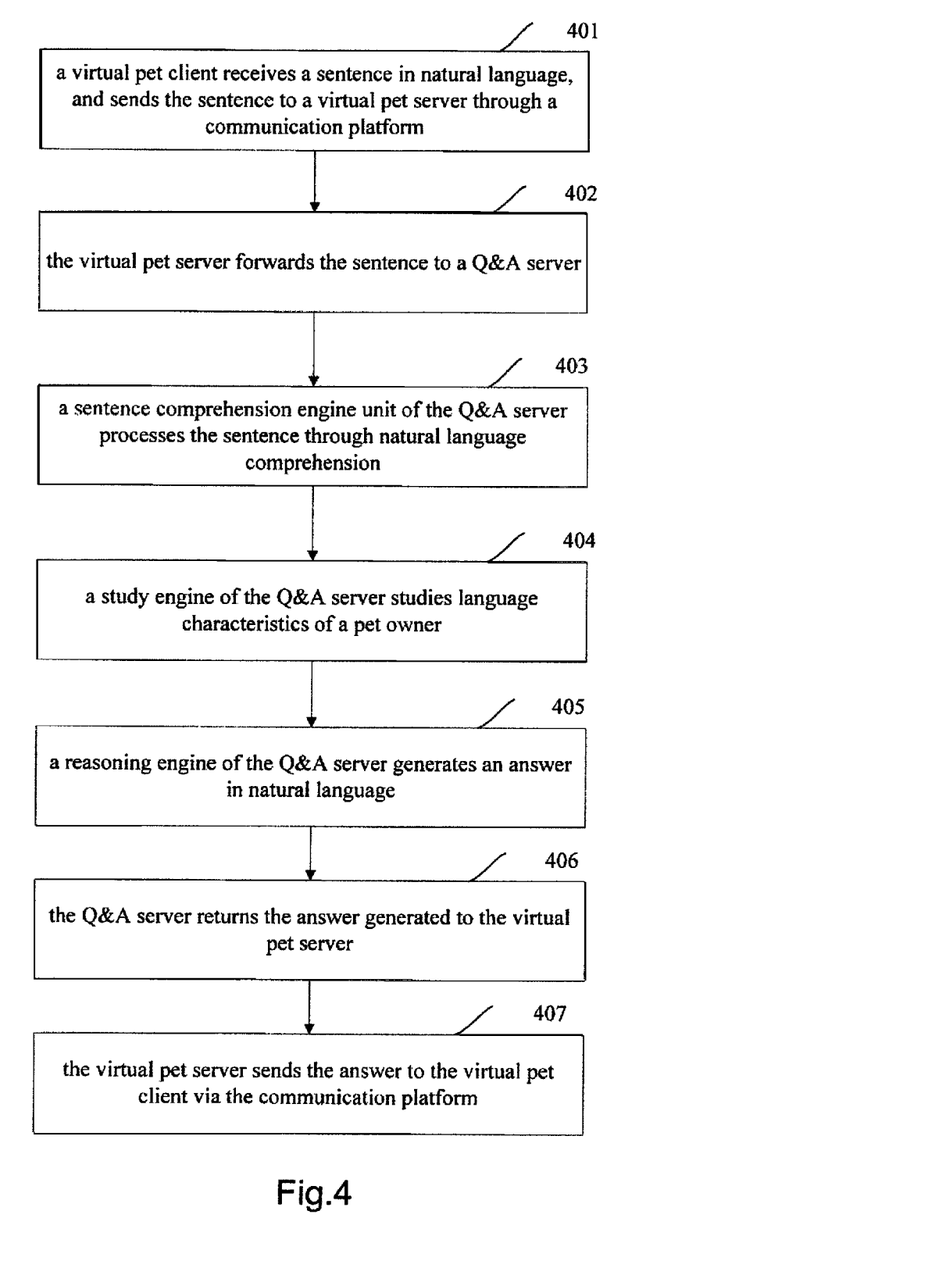
FIG. 4 is a schematic illustrating an exemplary process of a method for virtual pet chatting in accordance with an embodiment of the present invention.

FIG. 4 is a schematic illustrating an exemplary process of a method for virtual pet chatting in accordance with an embodiment of the present invention. As shown in FIG. 4, the process includes the following steps.

In step 401, a virtual pet client receives a sentence in natural language, and sends the sentence to a virtual pet server via a communication platform.

In step 402, the virtual pet server forwards the sentence in natural language to a Q&A server.

In step 403, a sentence comprehension engine unit of the Q&A server processes the sentence through natural language comprehension.

In step 404, a study engine unit of the Q&A server studies language characteristics of the pet owner based on a result of natural language comprehension.

In step 405, a reasoning engine unit of the Q&A server generates an answer in natural language based on reasoning knowledge and the result of natural language comprehension.

In step 406, the Q&A server returns the answer in natural language to the virtual pet server.

In step 407, the virtual pet server sends the answer in natural language to the virtual pet client via the communication platform.

The sentence in natural language received by the virtual pet client in step 401 may be inputted by the pet owner, or may be a sentence from another virtual pet client. If the sentence in natural language received by the virtual pet client is inputted by the pet owner, step 407 may also include: presenting the answer in natural language to the pet owner by the virtual pet client; if the sentence is from a second virtual pet client, step 407 may also include: returning the answer in natural language to the second virtual pet client. Preferably, the virtual pet client may further send the ID of the pet owner to the Q&A server via the virtual pet server in step 401. The Q&A server then obtains language characteristics of the pet owner from a pet owner language information base according to the ID of the pet owner, obtains pet attribute information and/or pet owner attribute information from a pet attribute base according to the ID of the pet owner, and generate an answer in natural language based on a result of natural language comprehension, reasoning knowledge, the language characteristics of the pet owner, and pet attribute information and/or pet owner attribute information.

Suppose there are at least two pet owners (say user A and user B) and user A wants to chat with the pet of user B, e.g. user A selects a pet of a friend from a friend list (i.e. pet B of user B), expecting to chat with the pet of the friend. Thus, in step 401, the virtual pet client may further send information of the pet to be chatted with (e.g. information of pet B) to the virtual pet server via a communication platform. In step 405, the Q&A server may further obtain the language characteristics of the owner (i.e. user B) of the pet to be chatted with from the pet owner language information base based on information of the pet; obtain pet attribute information and/or pet owner attribute information from the pet attribute base based on the information of the pet (i.e. pet B); and generate an answer in natural language based on the result of natural language comprehension, reasoning knowledge, the language characteristics of the pet owner, the pet attribute information and/or the pet owner attribute information.

Step 404 is an optional step and can be omitted. The study engine unit may study the language characteristics of the pet owner based on the result of natural language comprehension by obtaining and storing new language characteristics of the pet owner according to the result of natural language comprehension. In this step, the study engine unit may also adjust the language characteristics of the pet owner based on the result of natural language comprehension and a recorded chatting history of the pet owner. Thus, in step 405, the reasoning engine unit of the Q&A server may generate the answer in natural language based on the result of natural language comprehension, reasoning knowledge, adjusted language characteristics of the pet owner and pet attribute information and/or pet owner attribute information.

The natural language comprehension processing performed by the sentence comprehension engine unit of the Q&A server on the sentence in natural language may include: performing at least one of the operations including word separation, question trunk extraction, question type judgment and topic judgment on the sentence in natural language.

The reasoning knowledge should be stored in the form of question and answer pairs before step 405.

To sum up, the method of chatting with virtual pet provided by embodiments of the present invention makes full use of artificial intelligent techniques and natural language comprehension capabilities to provide much more entertaining experience for virtual pet owners. Specifically, (1) the virtual pet is able to perform natural language chat with the pet owner through the Q&A server, thus the virtual pet becomes more intelligent and entertaining; (2) the Q&A server keeps studying language characteristics of the pet owner and making the language characteristics of the pet owner be reflected in the answers in natural language, so that the user can perceive a closer relation with the pet and thus perceive a much more intelligent entertaining experience; (3) the Q&A server receives the sentence in natural language of user A and information of the pet to be chatted with (e.g. pet B), obtains language characteristics of the pet owner (e.g. user B) according to the information of the pet to be chatted with (pet B) to generate an answer in natural language, thereby implementing a chat between user A and the pet of user B and enabling the chat with a virtual pet more flexible and entertaining.

The foregoing descriptions are only preferred embodiments of the present invention and are not for use in limiting the protection scope thereof. Any modification, equivalent replacement and improvement made under the spirit and principle of the present invention should be included in the protection scope thereof.

The invention claimed is:

1. A virtual pet system, comprising: a virtual pet client device including a processor coupled to a memory storing instructions for execution by the processor and a question and answer (Q&A) server device including a processor coupled to a memory storing instructions for execution by the processor, wherein the virtual pet client device is to receive a sentence in natural language and send the sentence and an ID of a pet owner to the Q&A server device;

the Q&A server device is to receive the sentence in natural language, process the sentence through natural language comprehension, obtain language characteristics of the pet owner from a pet owner language information base according to the ID of the pet owner, generate an answer in natural language based on a result of natural language comprehensions, reasoning knowledge, and the language characteristics of the pet owner, and send the answer in natural language to the virtual pet client device;

wherein the language characteristics of the pet owner include language tips and expression manners.

2. The virtual pet system of claim 1, further comprising:
a pet attribute base, to store pet attribute information and/or pet owner attribute information; and
the Q&A server device is to obtain pet attribute information and/or pet owner attribute information from the pet attribute base according to the ID of the pet owner;
wherein the answer in natural language is generated based on the result of natural language comprehension, the language characteristics of the pet owner, the reasoning knowledge, and the obtained pet attribute information and/or pet owner attribute information.

3. The virtual pet system of claim 1, wherein
the virtual pet client device is to send information of a pet to be chatted with to the Q&A server device;
the Q&A server device is to obtain language characteristics of a pet owner from the pet owner language information base according to the information of the pet to be chatted with;
wherein the answer in natural language is generated based on the result of natural language comprehension, the language characteristics of the pet owner and the reasoning knowledge.

4. The virtual pet system of claim 3, further comprising:
a pet attribute base, to store pet attribute information and/or pet owner attribute information; and
the Q&A server device is to obtain pet attribute information and/or pet owner attribute information from the pet attribute base according to the information of the pet to be chatted with;
wherein the answer in natural language is generated based on the result of natural language comprehension, the language characteristics of the pet owner, the reasoning knowledge, and the pet attribute information and/or pet owner attribute information obtained.

5. The virtual pet system of claim 1, wherein
the Q&A server device is to adjust the language characteristics of the pet owner according to the result of natural language comprehension and a recorded chatting history of the pet owner, and store the adjusted language characteristics into the pet owner language information base;
wherein the answer in natural language is generated based on the result of natural language comprehension, the reasoning knowledge and the adjusted language characteristics of the pet owner;
and/or, the Q&A server device is to obtain new language characteristics of the pet owner from the result of natural language comprehension, and store the new language characteristics obtained into the pet owner language information base.

6. The virtual pet system of claim 1, wherein
the sentence in natural language received by the virtual pet client device is a sentence in natural language from a second virtual pet client device; and
the virtual pet client device is to send the answer in natural language from the Q&A server device to the second virtual pet client device.

7. The virtual pet system of claim 1, further comprising:
a virtual pet server device including a processor coupled to a memory storing instructions for execution by the processor, wherein those instructions when executed cause the processor to forward the sentence in natural language from the virtual pet client device to the Q&A server device, and forward the answer in natural language from the Q&A server device to the virtual pet client device.

8. The virtual pet system of claim 7, wherein when the number of virtual pet server devices is larger than two, the system further comprises a dispatch server device including a processor coupled to a memory storing instructions for execution by the processor, located between at least one virtual pet client device and multiple virtual pet server devices; and
the dispatch server device is to receive a sentence in natural language from a virtual pet client device, and send the sentence in natural language to a virtual pet server device based on load balancing principle.

9. The virtual pet system of claim 7, further comprising: a communication platform, located between at least one virtual pet client device and at least one virtual pet server device, and
the communication platform is to transport sentences in natural language and answers in natural language between the at least one virtual pet client device and the at least one virtual pet server device.

10. The virtual pet system of claim 9, wherein the communication platform comprises an Instant Messaging (IM) communication platform, an SMS communication platform, a Web communication platform, an Email communication platform, a mobile communication platform, or a PSTN communication platform.

11. The virtual pet system of claim 1, wherein the virtual pet client device is included in an instant messenger, a mobile communication terminal, a fixed communication terminal or a network interface.

12. A method of chatting with virtual pet, applied to a device comprising a processor coupled to a memory storing instructions for execution by the processor, the method comprising:
receiving, in the device, a sentence in natural language and an ID of a pet owner;
processing, in the device, the sentence through natural language comprehension, obtaining language characteristics of the pet owner from a pet owner language information base according to the ID of the pet owner, and generating an answer in natural language based on reasoning knowledge, a result of natural language comprehension , and the language characteristics of the pet owner;
wherein the language characteristics of the pet owner include language tips and expression manners.

13. The method of claim 12, further comprising:
before generating the answer in natural language,
receiving, in the device, information of the pet to be chatted with, and obtaining language characteristics of a pet owner according to the information of the pet; wherein
generating the answer in natural language comprises,
generating the answer in natural language based on the result of natural language comprehension, the reasoning knowledge and the language characteristics of the pet owner.

14. The method of claim 12, further comprising:
obtaining pet attribute information and/or pet owner attribute information according to the ID of the pet owner or the information of the pet; wherein
generating the answer in natural language based on the result of natural language comprehension, the reasoning knowledge and the language characteristics of the pet owner comprises,
generating the answer in natural language based on the result of natural language comprehension, the reasoning knowledge, the language characteristics of the pet owner, and the pet attribute information and/or pet owner attribute information.

15. The method of claim 12, further comprising:
before generating the answer in natural language based on the result of natural language comprehension, the reasoning knowledge, the language characteristics of the pet owner, adjusting the language characteristics of the pet owner based on the result of natural language comprehension and a recorded chatting history of the pet owner;

wherein generating the answer in natural language based on the result of natural language comprehension, the reasoning knowledge and the language characteristics of the pet owner comprises, generating the answer in natural language based on the result of natural language comprehension, the reasoning knowledge and the adjusted language characteristics of the pet owner.

16. The method of claim 12, further comprising:
after processing the sentence in natural language through natural language comprehension, obtaining new language characteristics of the pet owner based on the result of natural language comprehension, and storing the new language characteristics.

17. The method of claim 12, further comprising: before generating the answer in natural language based on the result of natural language comprehension and the reasoning knowledge, storing the reasoning knowledge in a form of question and answer pairs.

18. The method of claim 12, wherein processing the sentence in natural language through natural language comprehension comprises:
performing at least one of: word separation, question trunk extraction, question type judgment and topic judgment.

19. A question and answer (Q&A) server, comprising:
a processor coupled to a memory storing instructions for execution by the processor;
a sentence comprehension engine module, wherein when the instructions are executed by the processor the instructions cause the sentence comprehension engine module, to process a sentence in natural language received by the Q&A server through natural language comprehension, cause the QUA server to obtain language characteristics of a pet owner from a pet owner language information base according to an ID of the pet owner received by the Q&A server, and cause the Q&A server to send a result of natural language comprehension to a reasoning engine module; wherein the language characteristics of the pet owner include language tips and expression manners;
the reasoning engine module, wherein when the instructions are executed by the processor the instructions cause the reasoning engine module to generate an answer in natural language based on the language characteristics of the pet owner, reasoning knowledge and the result of natural language comprehension; and
a knowledge base, storing the reasoning knowledge.

20. The server of claim 19, wherein the reasoning engine module is to obtain pet attribute information and/or pet owner attribute information from a pet attribute base according to the ID of the pet owner; and
the answer in natural language is generated based on the result of natural language comprehension, the reasoning knowledge stored in the knowledge base, the language characteristics of the pet owner, and the pet attribute information and/or pet owner attribute information.

21. The server of claim 19, further comprising: a second information receiving module, wherein when the instructions are executed by the processor the instructions cause the second information receiving module to receive information of a pet to be chatted with; and
the reasoning engine module is to obtain language characteristics of the pet owner from the pet owner language information base according to the information of the pet to be chatted with, generates the answer in natural language based on the result of natural language comprehension, the reasoning knowledge stored in the knowledge base, and the language characteristics of the pet owner.

22. The server of claim 21, wherein the reasoning engine module is to obtain pet attribute information and/or pet owner attribute information from a pet attribute base according to the information of the pet to be chatted with; and
the answer in natural language is generated based on the result of natural language comprehension, the reasoning knowledge stored in the knowledge base, the language characteristics of the pet owner, and the pet attribute information and/or pet owner attribute information.

23. The server of claim 19, further comprising: a study engine module, wherein when the instructions are executed by the processor the instructions cause the study engine module to adjust the language characteristics of the pet owner according to the result of natural language comprehension and a recorded chatting history of the pet owner, and store the adjusted language characteristics into the pet owner language information base; and/or
obtain new language characteristics of the pet owner according to the result of natural language comprehension, and store the new language characteristics obtained into the pet owner language information base.

24. The server of claim 19, wherein the knowledge base is to store the reasoning knowledge in question and answer pairs.

25. The server of claim 19, wherein the sentence comprehension engine module is to perform at least one of word separation, question trunk extraction, question type judgment and topic judgment for performing natural language comprehension, and is to send the result of natural language comprehension to the reasoning engine module.

* * * * *